Nov. 2, 1937.　　　　E. W. MOORE　　　　2,097,798
LIGHT SIGNAL UNIT
Filed Jan. 30, 1936　　　　4 Sheets-Sheet 1
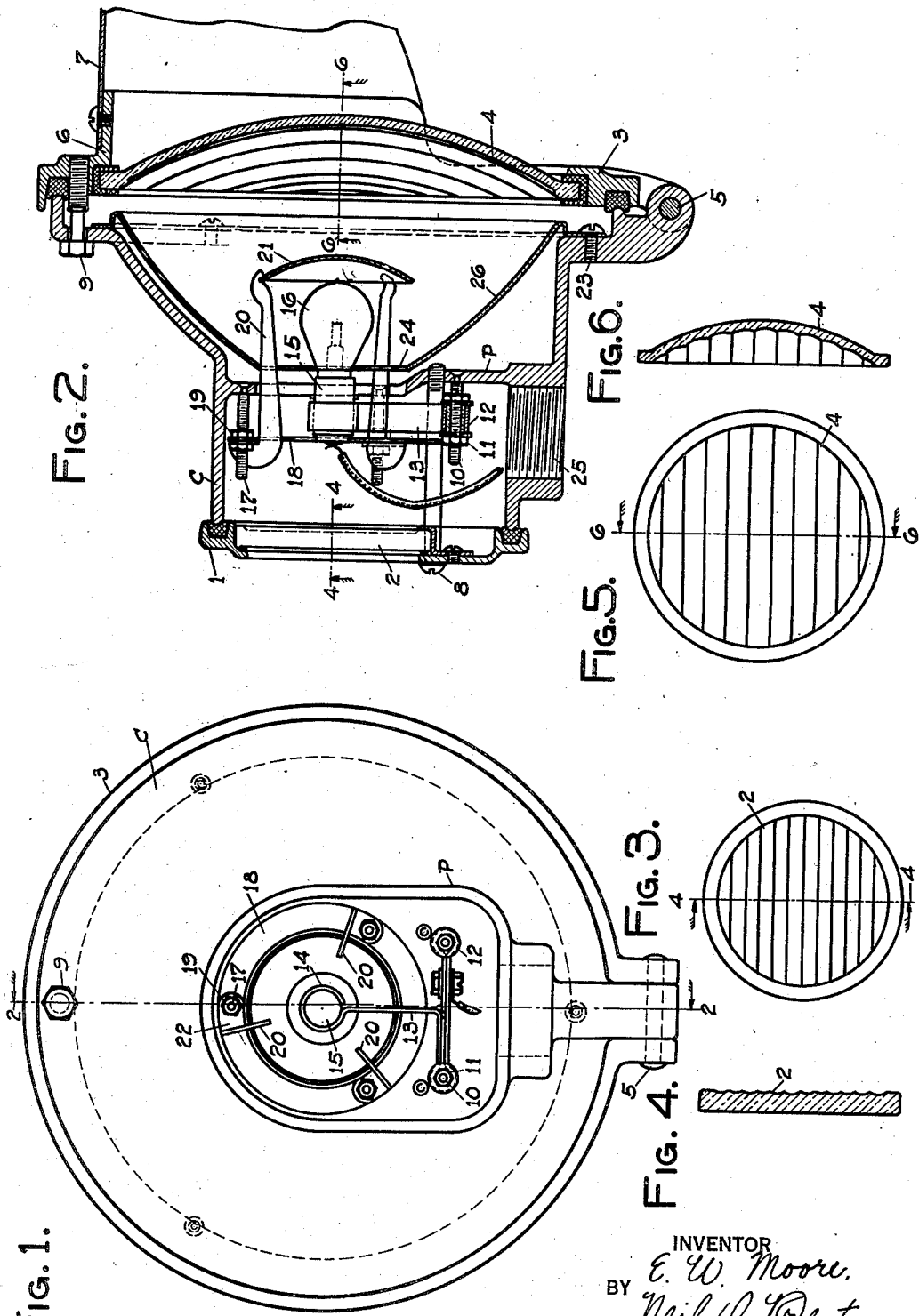
INVENTOR
E. W. Moore,
BY Neil D. Preston,
his ATTORNEY

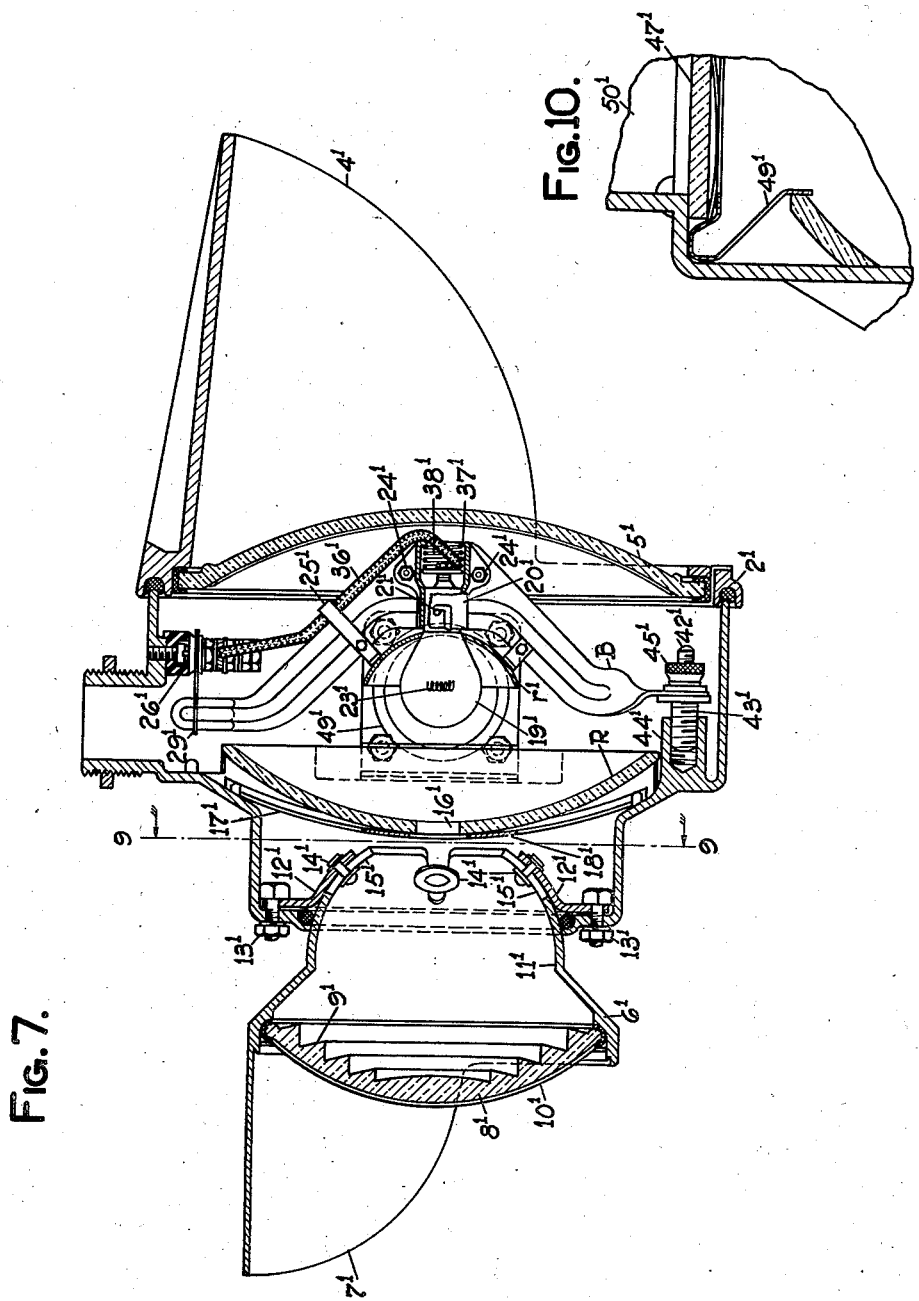

Nov. 2, 1937.  E. W. MOORE  2,097,798
LIGHT SIGNAL UNIT
Filed Jan. 30, 1936  4 Sheets-Sheet 3

INVENTOR
E. W. Moore,
BY Neil A. Preston,
his ATTORNEY

Nov. 2, 1937.    E. W. MOORE    2,097,798
LIGHT SIGNAL UNIT
Filed Jan. 30, 1936    4 Sheets-Sheet 4

INVENTOR
BY E. W. Moore,
Neil D. Preston,
his ATTORNEY

Patented Nov. 2, 1937

2,097,798

UNITED STATES PATENT OFFICE 2,097,798

LIGHT SIGNAL UNIT

Edmund W. Moore, Rochester, N. Y., assignor to General Railway Signal Company, Rochester, N. Y.

Application January 30, 1936, Serial No. 61,589

12 Claims. (Cl. 177—329)

This invention relates in general to light signals, and has more particular reference to a light signal for use in connection with safeguarding highway crossings.

The present application is a continuation in part of the subject matter of my prior application, Ser. No. 417,999 filed January 2, 1930; and of the subject matter required to be divided out of my other prior application Ser. No. 528,364 filed April 7, 1931, and now Patent 2,035,397, granted March 24, 1936.

Where highways cross railroad tracks, it is quite necessary that signals be placed to warn on-coming highway traffic when a train is within danger distance of the crossing.

This invention relates to a signal lamp for highway crossings to be used, for example, as in Patent 1,348,507 of August 3, 1920 to E. H. Meden.

One of the purposes of the present invention is to provide a danger indication visible to one on the highway, as a motorist, not only as he approaches the tracks, but after he has come abreast of, or passed, the signal, and is still on the near side of the tracks. Frequently motorists have stopped abreast of, or beyond, a crossing signal, and after awaiting the passage of a train, have crossed the tracks as soon as the train has cleared the crossing and have been struck by a train approaching on another track. This action is in many cases due to the fact that the danger indication can no longer be seen by such a motorist, since he has stopped so close to the track as to be out of the beam of the signal.

It is possible of course to have a signal which gives a beam directed toward the tracks as well as one directed towards the motorist as he approaches the track, but to provide these two indications by separate lamps makes the first cost and the operation of the signal uneconomical, and to provide them from a single lamp, in a manner so that sunlight or an automobile head light or the like can shine through from one side to the other of the signal, results in the grave probabilities of phantom or false indications.

With the above, and other considerations, in view, it is proposed in accordance with this invention to provide a signal light for highway crossings having a single light source and giving forward and rear indications, without the possibility of phantom indications. More specifically, this is accomplished by having a forward reflector for projecting light forwardly through a front lens, with a center opening in the reflector for allowing light to pass therethrough after having been reflected from a second and smaller rear reflector, to give a rear indication. The two reflectors together constitute an effective baffle against an outside source of light shining through the signal from one side to the other.

Further objects, purposes and characteristic features will appear as the description progresses, reference being made to the accompanying drawings showing, solely by way of example, and in no manner whatsoever in a limiting sense, several forms which the invention can assume. In the drawings:—

Fig. 1 is a rear end elevation, with parts removed, of a lamp embodying the invention.

Fig. 2 is a section on line 2—2 of Fig. 1.

Fig. 3 is a plan view of the rear lens.

Fig. 4 is a section on lines 4—4 of Figs. 2 and 3.

Fig. 5 is a plan view of the front lens.

Fig. 6 is a section on line 6—6 of Figs. 2 and 5.

Fig. 7 is a sectional side elevation of another embodiment of the invention, with parts shown in elevation.

Fig. 10 is a sectional view on line 10—10 of Fig. 8, viewed in the direction of the arrows.

Figure 8:
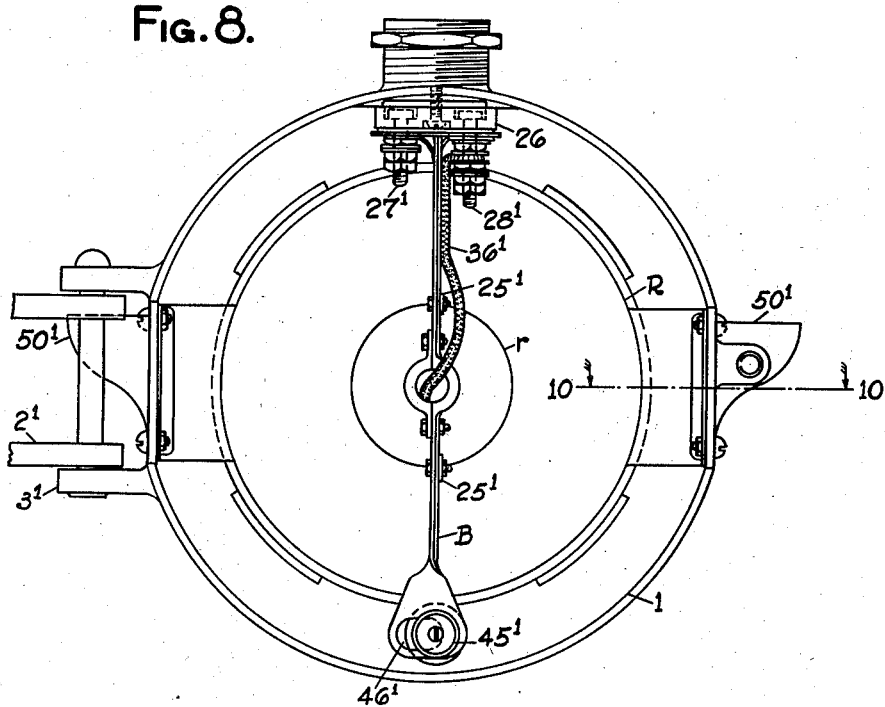
Fig. 8 is a front elevation of this embodiment with parts removed.
Figure 9:
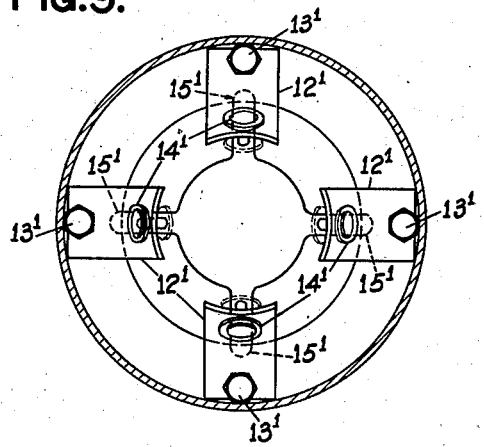
Fig. 9 is a sectional view on lines 9—9 of Fig. 7, viewed in the direction of the arrows.

As seen in the drawings, Figs. 1–6 inclusive, the signal lamp comprises a main casing C, open at its front and rear ends, with the rear end closed by a cover 1 carrying a lens 2 therein. The front opening is likewise closed by a cover 3, having a front lens 4 therein, this front cover being hinged at 5 to the casing C and having a forwardly projecting flange 6 to which is attached a usual sunjecting flange 6 to which is attached a usual sunshade or visor 7 for shielding the front lens and the interior of the casing from light from outside sources.

The two lenses 2 and 4 can be of any desired type, but preferably are, as shown in Figs. 3–6 inclusive, of a type to horizontally spread light passing therethrough whereby to make the signal visible even though one be practically abreast of the same.

The casing C has an internal transverse perforated partition P, in which is threaded a screw 8 for holding the rear cover 1 in place, the front cover 3 being held in place by means such as bolt 9.

Carried in the partition P are two threaded studs 10, on which are threaded nuts 11, with spacers 12 therebetween, for carrying a ribbon like lamp support 13 having a curved upper end 14 for encircling the base of a lamp socket 15 receiving an incandescent bulb 16. By manipulation of the nuts 11, the light source 16 can be moved along the optical axis of the reflector system.

Carried by the partition P, are threaded studs 17, in the present case three in number, on which is supported a ring 18, adjustable along the axis of the reflector system by means of nuts 19 on the studs 17. Carried by these studs and ring are supporting arms 20, for supporting a rear reflector 21, positioned in front of the light source. Each of these arms 20 has a wing-like portion 22 which is clamped to the ring 18 to hold the arm in proper position.

By adjusting the light source 16, and also adjusting the reflector 21 by moving the ring 18 and its supported arms 20 inwardly or outwardly along the optical axis of the reflector system, any desired relative adjustment between the lamp 16 and its reflector 21 can be realized. The ring 18 has clearance holes so that it can be readily tilted or canted out of the plane shown if necessary, to get the proper adjustment of the reflector 21 in a lateral and/or vertical direction.

A forward, main, reflector 26, is connected to the casing C as by screws 23, and is apertured at 24 for receiving the light source 16, the aperture 24 being in line with the reflector 21, whereby to allow light from the light source, after striking the reflector 21, to pass to the rear through the apertured reflector 26 and out through the lens 2 to constitute a rear indication.

The forward indication is produced by light from the light source striking the reflector 26 and being reflected forwardly through the front lens 4.

The light signal can be supported in any usual or desired manner as by means of the threaded socket 25.

The energization of the light source can be controlled either manually or, preferably, automatically in accordance with traffic conditions, in any usual or desired manner as, for example, in the manner shown in the application referred to above, and the signal unit can be supported in any usual or desired manner at the highway intersection with the railroad tracks.

From the above it is clearly to be seen that a single light source gives a forward and a rearward indication, thus making for economy and operation and also in initial expense of apparatus.

Furthermore the two reflectors, together, constitute an effective baffle against light passing through the signal casing from one side to the other, and thus effectively prevent any possibility of false or phantom indications due to external light sources. It is contemplated, that the aperture in the large reflector can be made smaller, or the small reflector larger, or both, if desired, so that no light whatsoever, from the exterior can pass the two reflectors, regardless of the angle from which it comes. Any light coming from an angle to the axis of a signal, such that it could pass the two reflectors unhindered, would be reflected from the casing or hood before emerging from the signal, and hence would be largely absorbed or broken up, so as to be incapable of causing a phantom indication of any harmful intensity.

Referring now to Figs. 7–14 of the drawings, this embodiment includes a main casing $1^1$ having a front and rear opening therein, the front opening being closed by a door $2^1$ hinged at $3^1$, and having a usual sunshade or visor $4^1$. The door $2^1$ for the front opening, carries a cover glass, $5^1$ colored red, and having a smooth outer surface, and an inner surface bearing vertical parallel flutes or ridges, (see Fig. 11) for giving the transmitted light a horizontal spread through, for example, 30° spread, preferably equally at each side of the optical axis, but it can be arranged to give a spread to but one side, as is to be described below with regard to a back light lens used in the signal.

Figure 11:
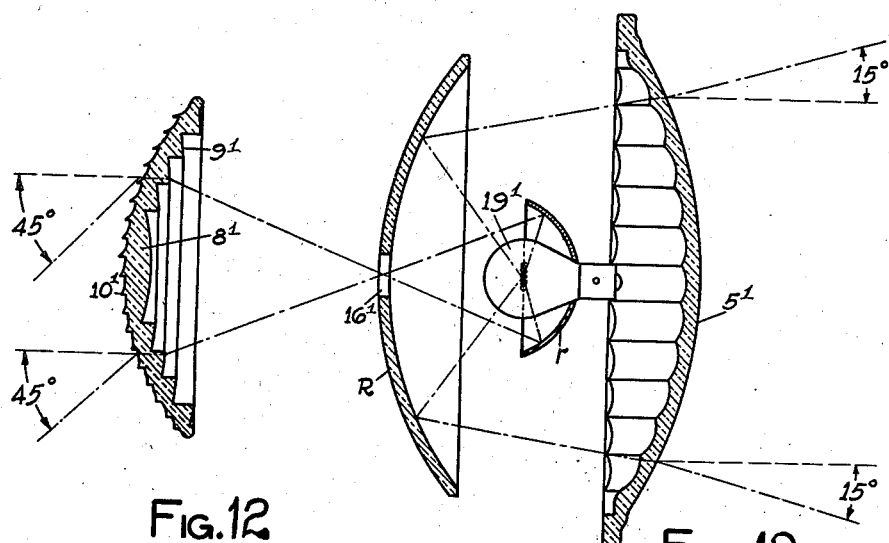
Fig. 11 is a diagrammatic view of the optical system employed in one embodiment of the invention.
Figure 12:
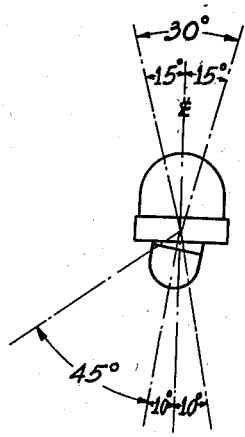
Figs. 12, 13 and 14 are wholly diagrammatic views illustrating various possible relative adjustments of front and back indications.
Figure 13:
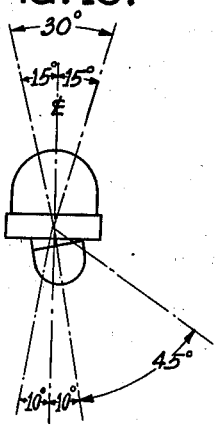
Figure 14:
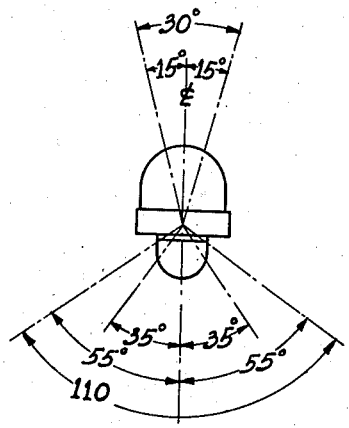

The rear opening in the casing, is closed by a movable housing $6^1$ carrying a sunshade or visor $7^1$, and a lens $8^1$ having its inner surface bearing concentric steps $9^1$ for projecting a substantially cylindrical beam of light, with the outer face of the lens bearing vertically positioned flutes or ridges $10^1$, preferably, as shown best in Fig. 11, so as to give a horizontal spread to but one side of the optical axis, the spread being to the side toward the vertical faces of the ridges. This spread can be of any desired amount but is preferably of the order of about 45°. This housing $6^1$ has a ball member $11^1$, receivable in a socket member $12^1$ connected to casing $1^1$ by bolts $13^1$, with retaining pins $14^1$ and slots $15^1$ connecting the two parts so as to permit a universal movement of any desired degree.

Within the main casing is a main reflector R, having a small aperture, or unsilvered, or otherwise transparent, portion $16^1$, at its center, the reflector being parabolic in form to project a substantially cylindrical beam out through the front cover glass $5^1$. This reflector R is held in the casing by means of retaining clips $49^1$ fastened to the casing and a spring clip $17^1$ bearing against the casing at its edges and against the reflector at the rear side thereof, over a cushioning apertured felt, or the like $18^1$.

The light source employed can be an incandescent bulb $19^1$ carried in a socket $20^1$ by means of pins $21^1$ so arranged with respect to the receiving slots $22^1$ that the filament $23^1$ is positioned vertically, as shown, whereby to give a desired vertical spread to the light passing through the lenses. The lamp socket $20^1$ is fastened to an elongated bracket, B, by means of bolts $24^1$, so as to be electrically connected thereto.

A small reflector, r, for the back sight, positioned opposite the opening $16^1$ in the main reflector R, is fastened to the support bracket B by means of two arms $25^1$, as shown.

The small reflector r is elliptical, in form, and the light source is positioned substantially at one of the conjugate foci of reflector r, with the other conjugate focus substantially at the center of the opening $16^1$ in reflector R, and at the focal point of lens $8^1$, whereby the light reflected rearwardly by r, is brought substantially to a point within aperture $16^1$ so that the aperture need be but very small. The light then spreads out to substantially fill the rear lens $8^1$, and be redirected thereby in the desired manner. By employing an elliptical reflector for the back light, a small opening, or light transparent portion, in the main reflector R is all that is necessary, and with such small opening, the two reflectors R and r constitute an effective opaque baffle against outside light shining directly through the two openings in the casing from end to end, and thus possibly causing phantom indications.

As described above, (see Fig. 11) the front cover glass 5¹ is arranged to preferably give a horizontal spread of light, symmetrical at the two sides of the optical axis, of the desired angle, such as 30°.

The rear lens 8¹, for giving the back sight, is arranged preferably with the non-symmetrical, vertical ridges or flutes 10¹ to give a horizontal spread, as of 45°, to but one side of the optical axis. This is desirable, when it is considered that in connection with a crossing signal at each side of a railroad where a highway crosses the railroad, an approaching person is warned by the main beam of the near signal on the right side of the road, of any danger, until he is abreast of this signal, after which he must depend on the back sight of the signal on the other side of the railroad track for continued warning. Since the signal on the other side of the track is to the left of the approaching person, it is desirable to provide means for shifting the direction of the back sight out of alignment in a horizontal plane, with the front sight. This shift must be greater, according as the width of the highway is greater, and also must be greater in the case where a highway, on crossing a track, bends to the right of the approaching person.

With the signal described above, an offset between the front and back beams, can readily be obtained by moving the casing 6¹ in its socket, and a further offset can be obtained by means of the non-symmetrical back lens employed. By turning the lens 8¹, 180°, the lens offset is produced to the opposite side, and the casing can be moved in its ball and socket joint, to the other side likewise. Thus, if the mechanical displacement, produced by moving casing 6¹, to either side, can produce a 10° displacement, and the lens can produce a 45° displacement, the two together can produce a displacement, to either side, of a maximum of 55°, and a minimum of 35°, the latter being obtained by having the mechanical displacement in the opposite direction from the lens displacement.

It is, of course, desirable to have a sufficient vertical spread of both the front and the back lights, to include objects close to the ground, and those higher up, so as to include drivers of all usually encountered vehicles. By positioning the filament of the lamp, in a vertical plane, instead of in the usual manner, in a horizontal plane, the desired vertical spread of the beams is obtained, without the necessity for any lens arrangement to give a vertical spread. In the case of the signal in question, the lens system need only be arranged to produce a horizontal spread.

At each side of the main casing, is a side opening 50¹, carrying a plane transparent member 47¹ therein, such as a piece of glass, for enabling inspection of the signal by the train crew, on passing a crossing, to observe whether or not the crossing signal is operating.

The above described construction of a crossing signal provides a very simple and compact structure which is rugged in form, economical to manufacture, and still is most satisfactory in performance and useful life.

The above specific description of several forms of inventions, has been given solely by way of illustration, and is not intended, in any manner whatsoever, in a limiting sense. Obviously, this invention can assume many different physical forms, and is susceptible of numerous modifications, and all such forms and modifications, are intended to be included by this invention, as come within the scope of the appended claims.

Having described my invention, I now claim:—

1. In a light signal, in combination, a casing having opposed aligned open ends, a single light source in the casing, two reflecting means positioned to face in opposite directions in the casing, to direct light from said single source simultaneously through the two open ends, one of the reflecting means being as large as either of said open ends, and being apertured, and the other reflecting means being at least equal in size to the aperture and positioned to prevent light from an external source from shining through the casing from open end to open end along the common center line of said open ends.

2. In a light signal, a casing having opposed open ends, a single light source in the casing aligned with the casing openings, a first reflector in the casing for projecting light through one casing opening, an aperture in the first reflector aligned with the casing openings and the light source, and a second reflector mounted in the casing and aligned with the casing openings and the light source to project light through the first reflector aperture and the other casing opening, the second reflector being at least as large as the aperture in the first reflector.

3. In a light signal, in combination, a casing, opposed openings in the front and rear of the casing, a single light source in the casing and in line with the openings, an apertured reflector positioned with its aperture in line with the openings and to project light from the light source through one opening, and a second reflector positioned in line with said openings and the aperture, and in area substantially equal to that of the aperture, in the apertured reflector to project light from the light source through the said aperture and the other opening.

4. In a light signal, in combination, a casing having opposed open ends, a single light source in the casing in line with the open ends, two non-transparent reflectors positioned in the casing to direct light from said source, respectively, through said open ends, one of the reflectors being centrally apertured, the other reflector being positioned in line with said aperture and the open ends, and reflecting light through said aperture, adjusting means for the light source, and adjusting means for one of the reflectors, said other reflector being in area substantially equal to that of the aperture in the apertured reflector.

5. In a light signal, in combination, a casing, opposite openings in the front and rear of the casing, a single light source in the casing, a centrally apertured reflector in line with the openings and positioned to substantially cover the front opening and project light from the light source through the front opening, and a second reflector positioned in line with the casing openings and the aperture in the apertured reflector, to project light from the light source through the said aperture and casing rear opening, the second reflector covering substantially the same area as is included by the said aperture.

6. In a light signal, in combination, a casing having opposed aligned open ends, a single light source in the casing, two reflecting means positioned to face in opposite directions in the casing, to direct light from said single source simultaneously through the two open ends, one of the reflecting means being as large as either of said open ends and arranged to substantially cover the end through which it projects light, and being apertured, and the other reflecting means being at least equal in size to the aperture and positioned to prevent light from an external source from shining through the casing from open end to open end along the common center line of said open ends.

7. In a light signal, a casing having opposed open ends, a single light source in the casing aligned with the casing openings, a first reflector in the casing for projecting light through one casing opening, and substantially covering such opening, an aperture in the first reflector aligned with the casing openings and the light source, and a second reflector mounted in the casing and aligned with the casing openings and the light source to project light through the first reflector aperture and the other casing opening, the second reflector being at least as large as the aperture in the first reflector.

8. In a light signal, in combination, a casing, opposed openings in the front and rear of the casing, a single light source in the casing and in line with the openings, an apertured reflector positioned with its aperture in line with the openings and to project light from the light source through one opening, and being of substantially the same shape and area as the one opening, and a second reflector positioned in line with said openings and the aperture, and in area substantially equal to that of the aperture, in the apertured reflector to project light from the light source through the said aperture and the other opening.

9. In a light signal, in combination, a casing having an open front and rear, a single light source in the casing, a first opaque reflector for directing light through one of the casing openings, a light transparent portion in said reflector, and a second, opaque reflector of elliptical conformation for directing light through the transparent portion and the other casing opening.

10. In a light signal, in combination, a casing having an open front and rear, a single light source in the casing, a first opaque reflector for directing light through one of the casing openings, a light transparent portion in said reflector, and a second, opaque reflector of elliptical conformation for directing light through the transparent portion and the other casing opening, one of the conjugate foci of the second reflector being at said transparent portion, and the other focus at said light source, the reflectors being in line with each other and with the casing openings, and of a size to prevent light from shining through the casing.

11. In a light signal, in combination, a casing having an open front and rear, a single light source in the casing, a first opaque reflector for directing light through one of the casing openings, a light transparent portion in said reflector, and a second, opaque reflector of elliptical conformation for directing light through the transparent portion and the other casing opening, the first reflector being directly in line with, and at least equal in size to, one of the casing openings, and the second reflector being directly in line with, and at least equal in size to, said transparent portion.

12. In a light signal, in combination, a casing having an open front and rear, a single light source in the casing, a first opaque reflector for directing light through one of the casing openings, a light transparent portion in said reflector, and a second, opaque reflector of elliptical conformation for directing light through the transparent portion and the other casing opening, one of the conjugate foci of the second reflector being at said transparent portion, and the other focus at said light source, the first reflector being directly in line with, and at least equal in size to, one of the casing openings, and the second reflector being directly in line with, and at least equal in size to, said transparent portion.

EDMUND W. MOORE.